United States Patent
Shingu

(10) Patent No.: US 9,224,305 B2
(45) Date of Patent: Dec. 29, 2015

(54) INFORMATION PROCESSING APPARATUS, INFORMATION PROCESSING METHOD, AND NON-TRANSITORY COMPUTER READABLE MEDIUM STORING INFORMATION PROCESSING PROGRAM

(75) Inventor: Jun Shingu, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 652 days.

(21) Appl. No.: 13/596,874

(22) Filed: Aug. 28, 2012

(65) Prior Publication Data

US 2013/0251334 A1 Sep. 26, 2013

(30) Foreign Application Priority Data

Mar. 23, 2012 (JP) ................................. 2012-067779

(51) Int. Cl.
*H04N 5/92* (2006.01)
*G09B 5/02* (2006.01)
*G06F 17/30* (2006.01)

(52) U.S. Cl.
CPC ............ *G09B 5/02* (2013.01); *G06F 17/30787* (2013.01)

(58) Field of Classification Search
CPC ............... H04N 5/85; G11B 20/10527; G11B 20/00992; G11B 27/3027; G10L 19/16
USPC ........................................................ 386/399
See application file for complete search history.

(56) References Cited

U.S. PATENT DOCUMENTS

| 5,818,436 A | 10/1998 | Imai et al. |
| 2003/0188255 A1* | 10/2003 | Shimizu et al. ............ 715/501.1 |
| 2008/0055468 A1* | 3/2008 | Abe .............................. 348/515 |
| 2010/0057458 A1 | 3/2010 | Iwaki et al. |

FOREIGN PATENT DOCUMENTS

| JP | A-5-233719 | 9/1993 |
| JP | A-6-343146 | 12/1994 |
| JP | A-2001-56822 | 2/2001 |
| JP | A-2010-55259 | 3/2010 |

* cited by examiner

Primary Examiner — William C Vaughn, Jr.
Assistant Examiner — Daniel Tekle
(74) Attorney, Agent, or Firm — Oliff PLC

(57) ABSTRACT

An information processing apparatus includes a sound recognition unit that recognizes a sound of a moving image including a captured document, a detecting unit that detects a word which appears in both a recognition result of the sound recognition unit and a word extracted from the captured document in the moving image, an extracting unit that extracts an occurrence time of the word detected by the detecting unit in the moving image and a position of the word in the document, a display unit that displays the word extracted by the extracting unit on the document in a different manner from that in which another word is displayed, a designating unit that designates the word displayed by the display unit on the basis of an operation of an operator, and a reproducing unit that reproduces the moving image from the occurrence time of the word designated by the designating unit.

17 Claims, 20 Drawing Sheets

FIG. 4

| MOVING IMAGE ID | SLIDE ID | START TIME | END TIME |
|---|---|---|---|
| | | | |

FIG. 5

| 510 | 520 | 530 | 540 | 550 554 | ... |
|---|---|---|---|---|---|
| MOVING IMAGE ID | SLIDE ID | NUMBER OF WORDS | WORD 1 | WORD POSITION 552 | |
| | | | | x | y | |

| MOVING IMAGE ID | SLIDE ID | WORD | WORD POSITION | | OCCURRENCE TIME | CLUSTER ID |
|---|---|---|---|---|---|---|
| 910 | 920 | 930 | 942 x | 944 y | 950 | 960 |

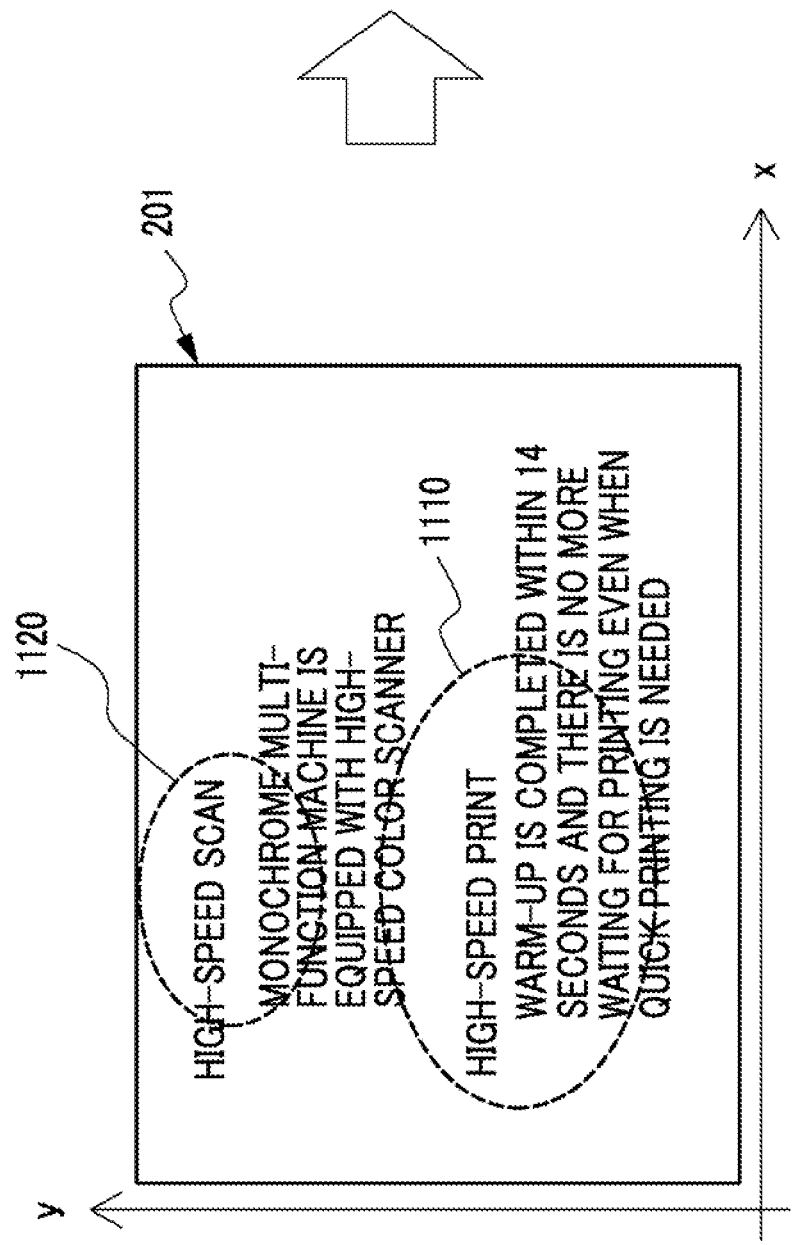

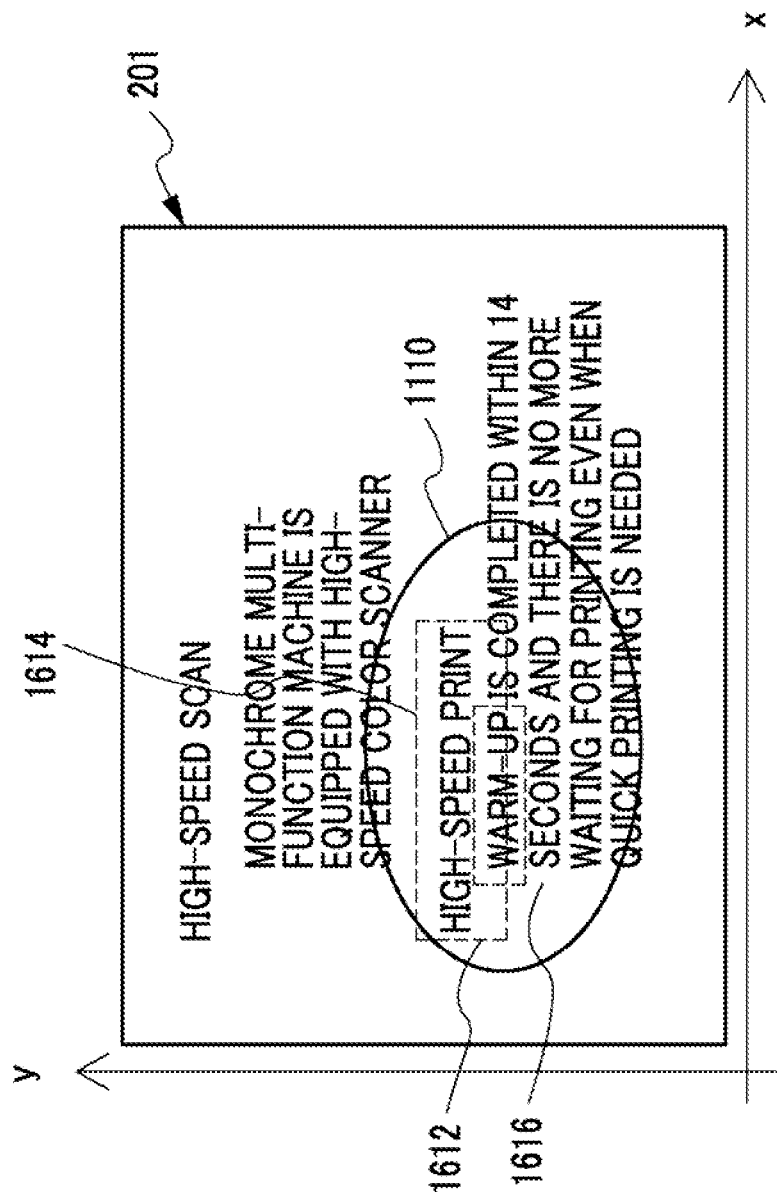

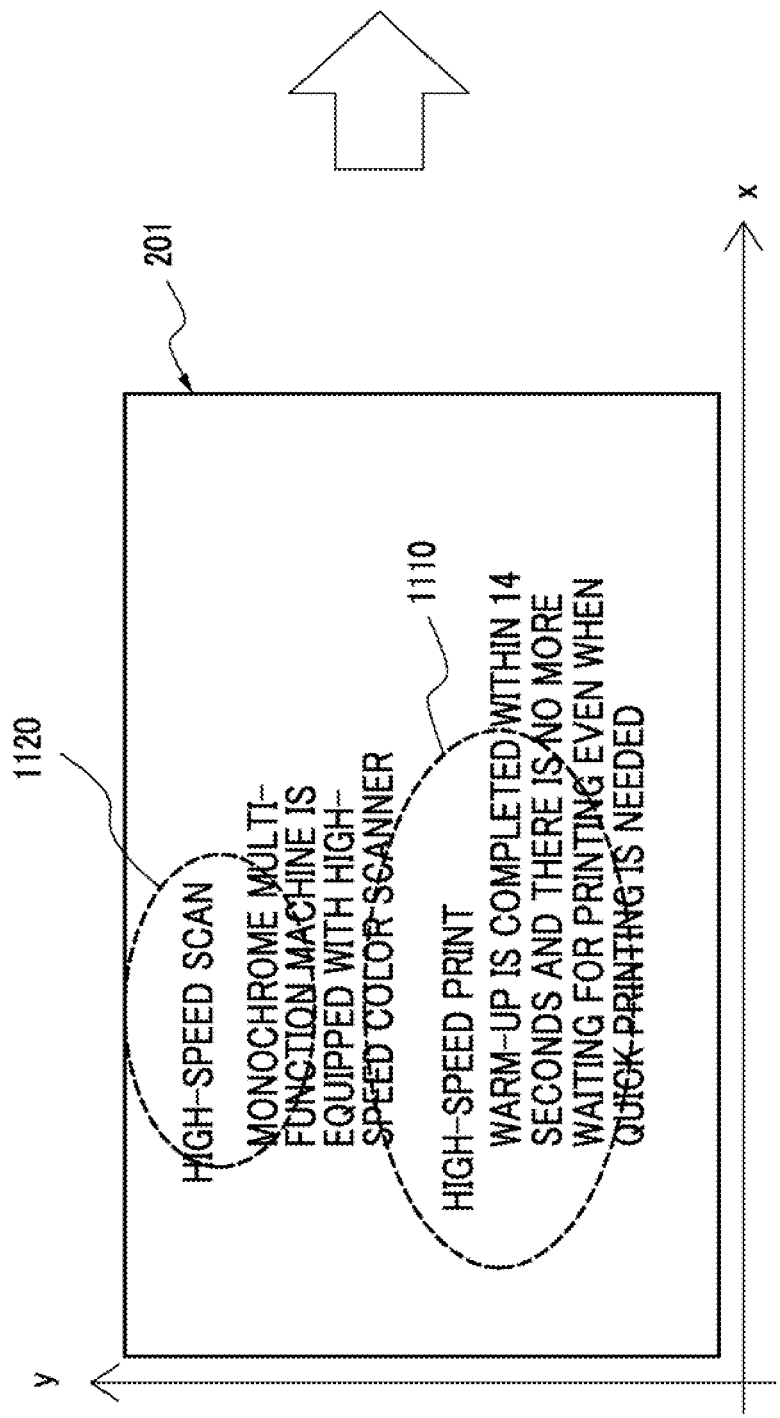

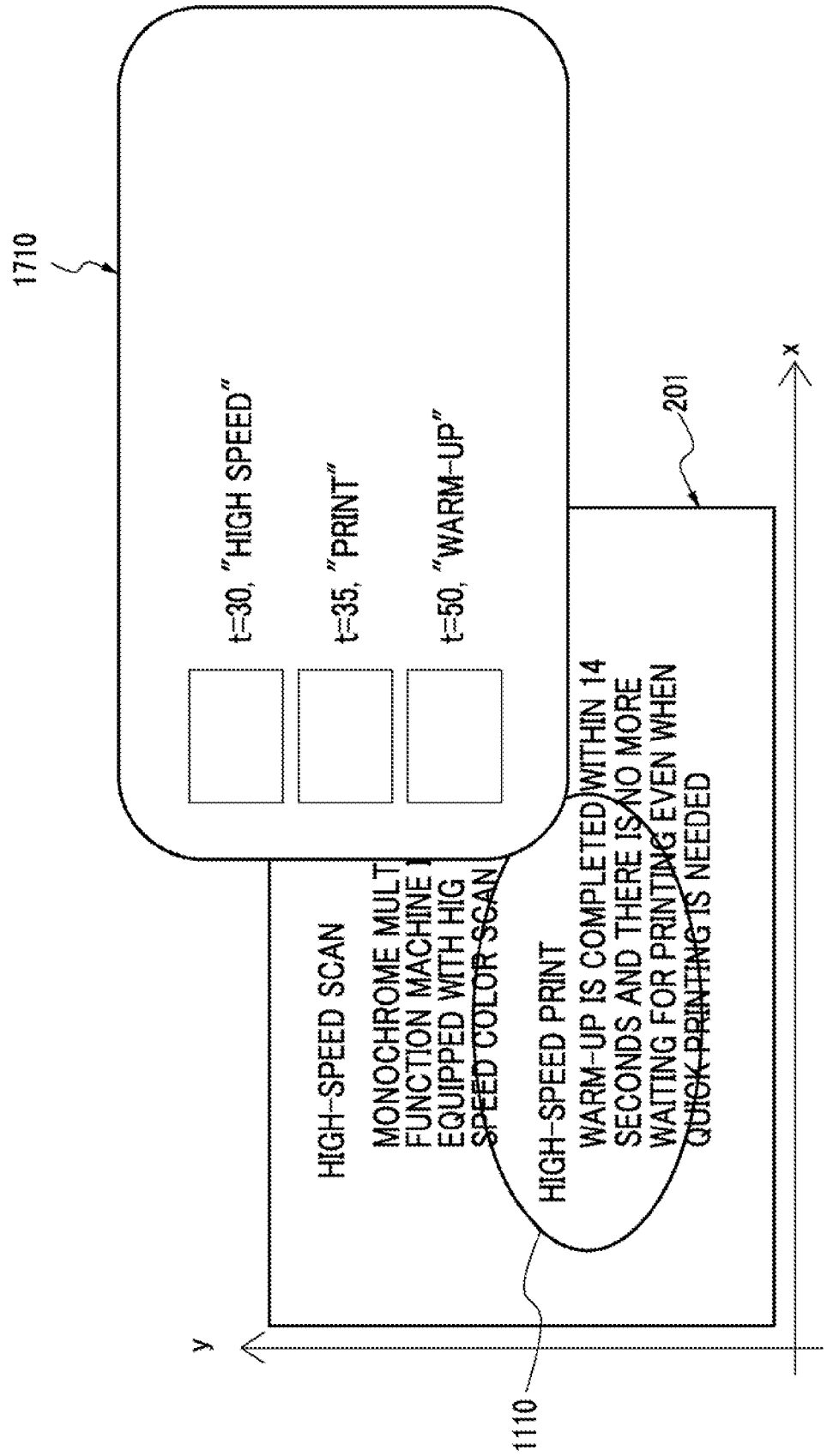

INFORMATION PROCESSING APPARATUS, INFORMATION PROCESSING METHOD, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2012-067779 filed Mar. 23, 2012.

BACKGROUND

Technical Field

The present invention relates to an information processing apparatus, an information processing method, and a non-transitory computer readable medium storing an information processing program.

SUMMARY

According to an aspect of the invention, there is provided an information processing apparatus including: a sound recognition unit that recognizes a sound of a moving image including a document; a detecting unit that detects a word which appears in both a recognition result of the sound recognition unit and a word extracted from the document in the moving image; an extracting unit that extracts an occurrence time of the word detected by the detecting unit in the moving image and a position of the word in the document; a display unit that displays the word extracted by the extracting unit on the document in a different manner from that in which another word is displayed; a designating unit that designates the word displayed by the display unit on the basis of an operation of an operator; and a reproducing unit that reproduces the moving image from the occurrence time of the word designated by the designating unit.

BRIEF DESCRIPTION OF THE DRAWINGS

Exemplary embodiments of the present invention will be described in detail based on the following figures, wherein:

FIG. 4 is a diagram illustrating an example of the data structure of a moving image and slide table;

FIG. 5 is a diagram illustrating an example of the data structure of a slide and word table;

FIG. 9 is a diagram illustrating an example of the data structure of a word and cluster table;

FIGS. 16A and 16B are diagrams illustrating an example of the display of the display module and a designation module;

FIGS. 17A and 17B are diagrams illustrating an example of the display of the display module and a designation module.

DETAILED DESCRIPTION

Hereinafter, an exemplary embodiment of the invention will be described with reference to the accompanying drawings.

Figure 1:
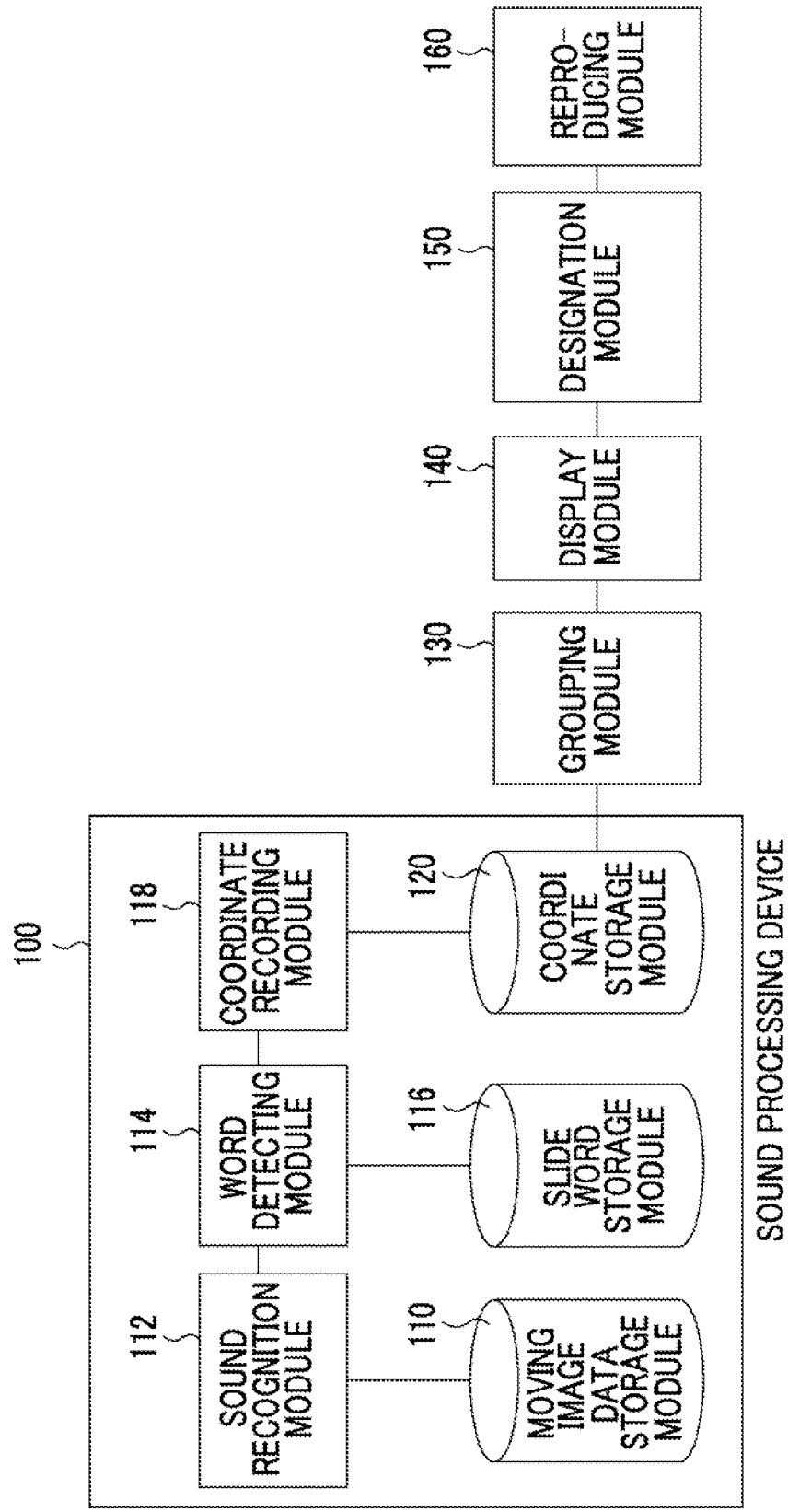
FIG. 1 is a conceptual module configuration diagram illustrating an example of a structure according to an exemplary embodiment.

FIG. 1 is a conceptual module configuration diagram illustrating an example of a structure according to this exemplary embodiment.

The term "module" refers generally to a component, such as logically separable software (computer program) and hardware. Therefore, a module in this exemplary embodiment indicates not only a module in a computer program but also a module in a hardware structure. Thus, this exemplary embodiment relates to a computer program (including a program which causes a computer to perform each process, a program which causes a computer to function as each unit, and a program which causes a computer to implement the functions of each unit) that causes a computer to function as modules, a system, and a method. For convenience of description, as used herein, "store," "be stored", or the equivalents thereof mean that a computer program is stored in a storage device or is controlled such that it is stored in a storage device when the exemplary embodiment relates to the computer program. The module may be in one-to-one correspondence with a function. When modules are mounted, one module may be configured as one program, plural modules may be formed by one program, or one module may be formed by plural programs. Plural modules may be implemented by one computer, or one module may be implemented by plural computers in distributed or parallel environments. One module may include other modules. Hereinafter, the term "connection" includes physical connection and logical connection (for example, the transmission and reception of data, instructions, and the reference relationship between data). The term "predetermined" means being predetermined prior to a target process. The term "predetermined" includes not only determination before a process according to the exemplary embodiment starts but also determination according to situations and conditions at that time or situations and conditions up to that time before a target process after the process according to the exemplary embodiment starts. When there are plural "predetermined values", the predetermined values may foe different from each other or two or more values (of course, including all values) may be equal to each other. In addition, the sentence "when A is satisfied, B is performed" means that "if it is determined that A is satisfied, B is performed". However, a case in which it is not necessary to determine whether A is satisfied is excluded.

The term "system" or "apparatus" includes a structure including, for example, one computer, hardware, and a device and a structure in which, for example, plural computers, hardware, and devices are connected to each other by a communication unit, such as a network (including one-to-one correspondence communication connection). In the specification, "apparatus" is synonymous with "system." Of course, the "system" does not include anything that is merely a social "structure" (social system) that includes artificial decisions.

For each process by each module or each process when plural processes are performed in a module, target information is read from a storage device and is then processed and the process result is written to the storage device. Therefore, in some cases, the description of reading information from the storage device before the process and writing the process result to the storage device after the process is omitted. The storage device may include, for example, a hard disk, a RAM (Random Access Memory), an external storage medium, a storage device through a communication line, and a register in a CPU (Central Processing Unit).

An information processing apparatus according to this exemplary embodiment reproduces a moving image and includes a sound processing device 100, a grouping module 130, a display module 140, a designation module 150, and a reproducing module 160, as shown in FIG. 1.

The sound processing device 100 includes a moving image data storage module 110, a sound recognition module 112, a word detecting module 114, a slide word storage module 116, a coordinate recording module 118, and a coordinate storage module 120.

There is a technique which captures the moving image (video) of a lecturer giving an explanation using a document (hereinafter, also referred to as a slide) and displays the moving image in time synchronization between the slide and a video. In the technique, it is possible to select a specific slide, thereby reproducing the video explaining the slide.

There is a case in which the user wants to listen to an explanation only for a portion of the slide.

In this exemplary embodiment, the explanation for a portion of the slide is determined using sound information about the moving image and the explanation is associated with a position in the slide. When a portion of the slide is designated, the moving image is reproduced from the corresponding position.

The document is not limited to a captured one. For example, after a document is published and the like, the document may be stored in the moving image data storage module 110. In this case, it is necessary to store the captured moving image in synchronization with the document (slide) in an image picture editorial operation and the like.

The moving image data storage module 110 is connected to the sound recognition module 112. The moving image data storage module 110 stores the moving image of the captured slides. The moving image is mainly obtained by capturing, for example, presentation or explanation using documents. Specifically, the moving image is obtained by capturing the content of, for example, a lecture or a lesson, but is not limited thereto. Any content using documents may be captured to form the moving image. For example, the moving image may be obtained by capturing an explanation for financial products. The term "document" includes at least characters and may include figures, images, moving images, or combinations thereof according to circumstances. Examples of the captured document include a document projected by a projector and a document displayed on a large display.

Figure 2:
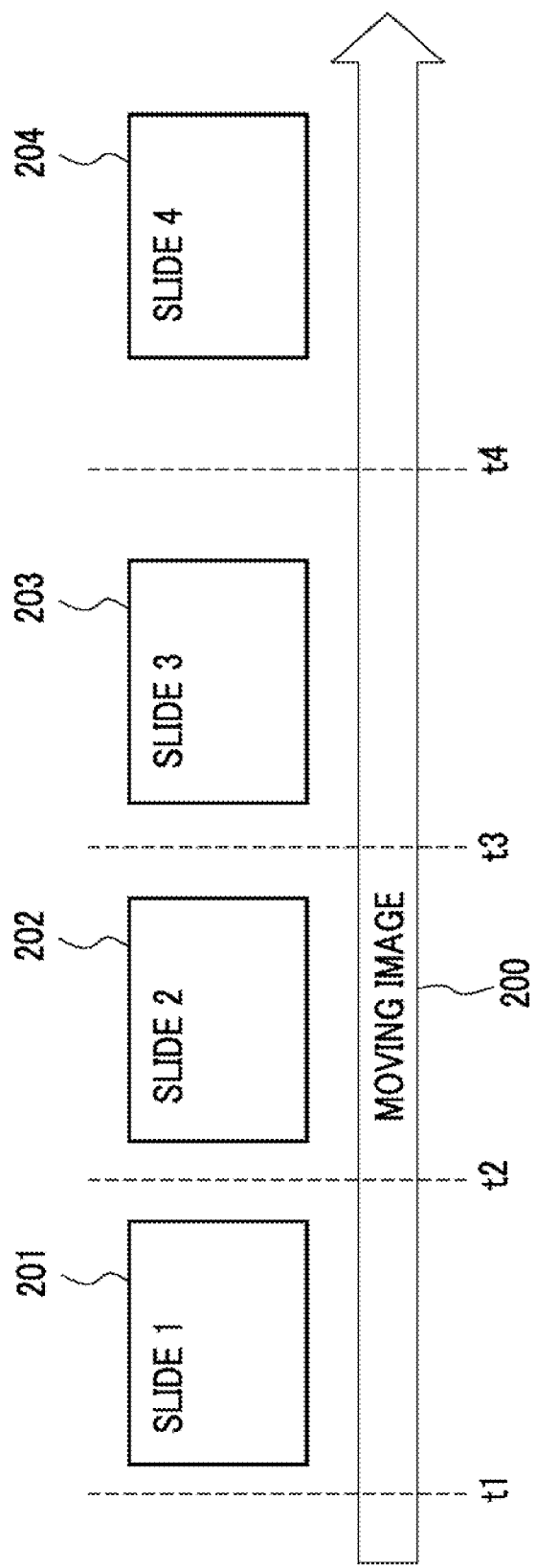
FIG. 2 is a diagram illustrating an example of data in a moving image data storage module.

The moving image data storage module 110 stores information about the display time (for example, time from t1 to t2) of the moving image in which the slide synchronized with the moving image is displayed. FIG. 2 is a diagram illustrating an example of data in the moving image data storage module 110. In a moving image 200, data indicating that slide 1 (201) is displayed from t1 to t2, slide 2 (202) is displayed from t2 to t3, slide 3 (203) is displayed from t3 to t4, and slide 4 (204) is displayed from t4 is stored in the moving image data storage module 110.

Specifically, the moving image data storage module 110 stores a moving image and slide table 400. FIG. 4 is a diagram illustrating an example of the data structure of the moving image and slide table 400. The moving image and slide table 400 includes a moving image ID field 410, a slide ID field 420, a start time field 430, and an end time field 440. The moving image ID field 410 stores a moving image ID (IDentification), which is information for uniquely identifying the moving image 200 in this exemplary embodiment. The moving image ID may be used to access moving image data. The slide ID field 420 stores a slide ID, which is information for uniquely identifying (page of) the captured document in the moving image in this exemplary embodiment. The slide ID may be used to extract text data described in the slide. The start time field 430 stores the time when the slide starts to be captured (the time elapsed from the beginning in the moving image 200 or the date and time (year, month, day, second, millisecond, or combinations thereof)). The end time field 440 may store the time when the capture of the slide ends (the time elapsed from the beginning in the moving image 200 or the date and time (year, month, day, second, millisecond, or combinations thereof)).

The sound recognition module 112 is connected to the moving image data storage module 110 and the word detecting module 114. The sound recognition module 112 recognizes a sound in the moving image including the captured slides stored in the moving image data storage module 110. As a sound recognizing process, the existing technique may be used. Since words in the slide have been stored in the slide word storage module 116, sound recognition may be performed only for the words in the slide. In this case, the start time field 430 and the end time field 440 of the moving image and slide table 400 may be used and the sound recognition may be performed only for the words in the slide captured between the start time and the end time. The recognition result may include a word and the occurrence time of the word in the moving image (the time may include a speech start time and a speech end time).

The word detecting module 114 is connected to the sound recognition module 112, the slide word storage module 116, and the coordinate recording module 118. The word detecting module 114 detects a word which appears in both the recognition result of the sound recognition module 112 and the words extracted from the captured slide in the moving image. The "words extracted from the captured slide in the moving image" are stored in the slide word storage module 116. For example, a process of matching the recognition result of the sound recognition module 112 with the words stored in the slide word storage module 116 may be performed. When sound recognition is performed only for the words in the slide, the word which is stored in the slide word storage module 116 and is subjected to sound recognition by the sound recognition module 112 may be detected.

The slide word storage module 116 is connected to the word detecting module 114. The slide word storage module 116 stores the words extracted from the captured slide in the moving image. The slide word storage module 116 stores the position of each word on the slide in which sentences are changed into text. For example, as a result of character recognition, words may be extracted from the slide file.

For example, the characters shown in FIG. 2 are described in slide 1 (201). In order to extract characters from slide 1 (201), a character recognition process may be performed on the captured slide 1 (201) or text data may be extracted from the original file (electronic data) of slide 1 (201). Then, morphological analysis (for example, matching with the words in a word dictionary) is performed on the text data to extract the words. The positions of the words in slide 1 (201) are extracted.

Figure 3:
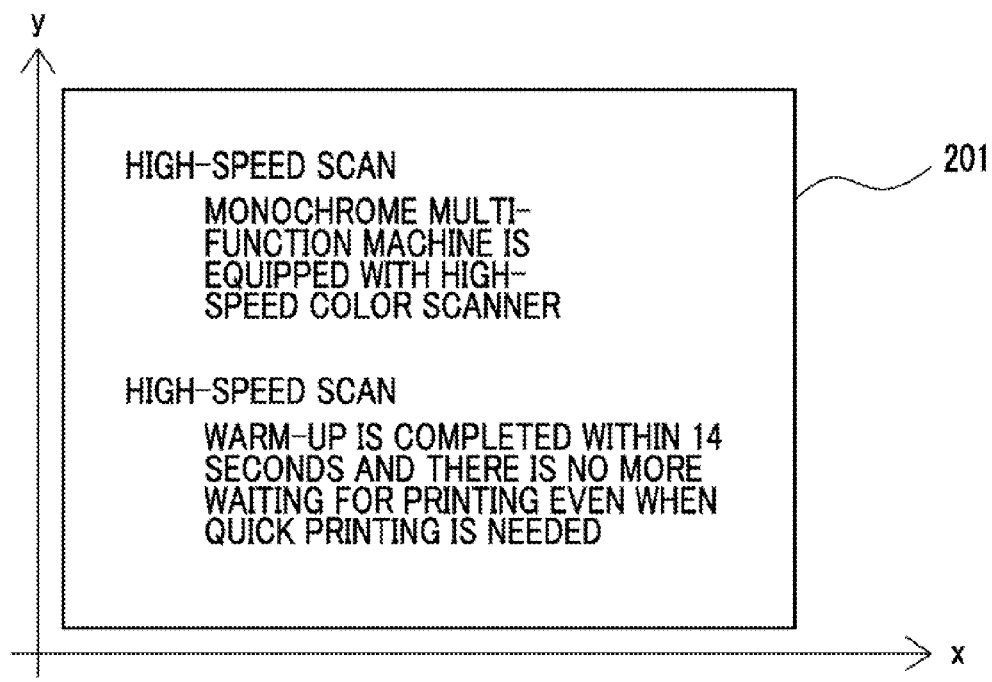
FIG. 3 is a diagram illustrating an example of data in a slide word storage module.
Figure 5:
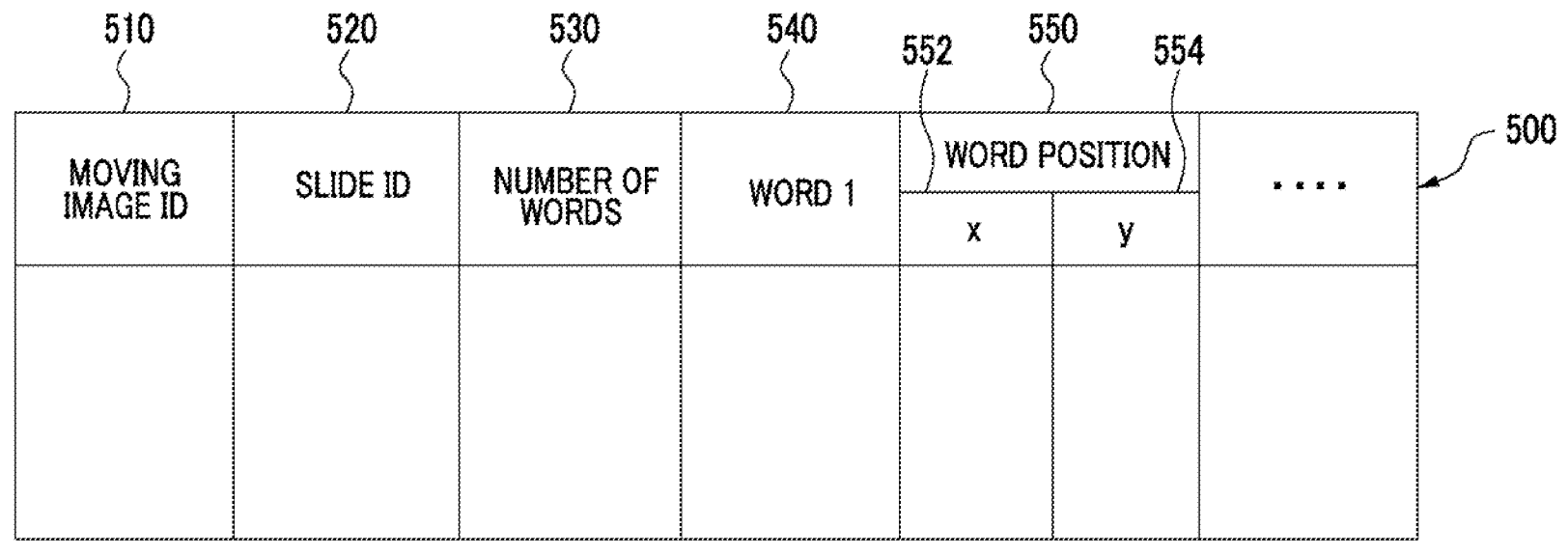

The slide word storage module 116 stores, for example, a slide and word table 500. FIG. 5 is a diagram illustrating an example of the data structure of the slide and word table 500. The slide and word table 500 includes a moving image ID field 510, a slide ID field 520, a word number field 530, a word 1 field 540, and a word position field 550. The word position field 550 includes an x field 552 and a y field 554. The moving image ID field 510 stores the moving image ID. The slide ID field 520 stores the slide ID. The word number field 530 stores the number of words in the slide. A combination of the word 1 field 540 and the word position field 550 corresponding to the number of words is stored in the slide and word table 500. The word 1 field 540 stores words (text data). The word position field 550 stores the positions of the words in the slide. The x field 552 stores the x coordinate. The y field 554 stores the y coordinate. For example, as shown in FIG. 3, a coordinate system having the lower left side of the slide as the origin or a coordinate system having the upper left side of the slide as the origin may be used.

The coordinate recording module 118 is connected to the word detecting module 114 and the coordinate storage module 120. The coordinate recording module 118 extracts the occurrence time of the word defected by the word detecting module 114 in the moving image and the position of the word in the slide. Then, the coordinate recording module 118 stores the extracted information in the coordinate storage module 120. The "occurrence time of the word in the moving image" is the recognition result of the sound recognition module 112. The "position of the word in the slide" may be extracted from the slide word storage module 116 (specifically, the x field 552 and the y field 554 of the slide and word table 500 corresponding to the word).

The coordinate storage module 120 is connected to the coordinate recording module 118 and the grouping module 130. The coordinate storage module 120 stores the extraction result of the coordinate recording module 118.

Figure 9:
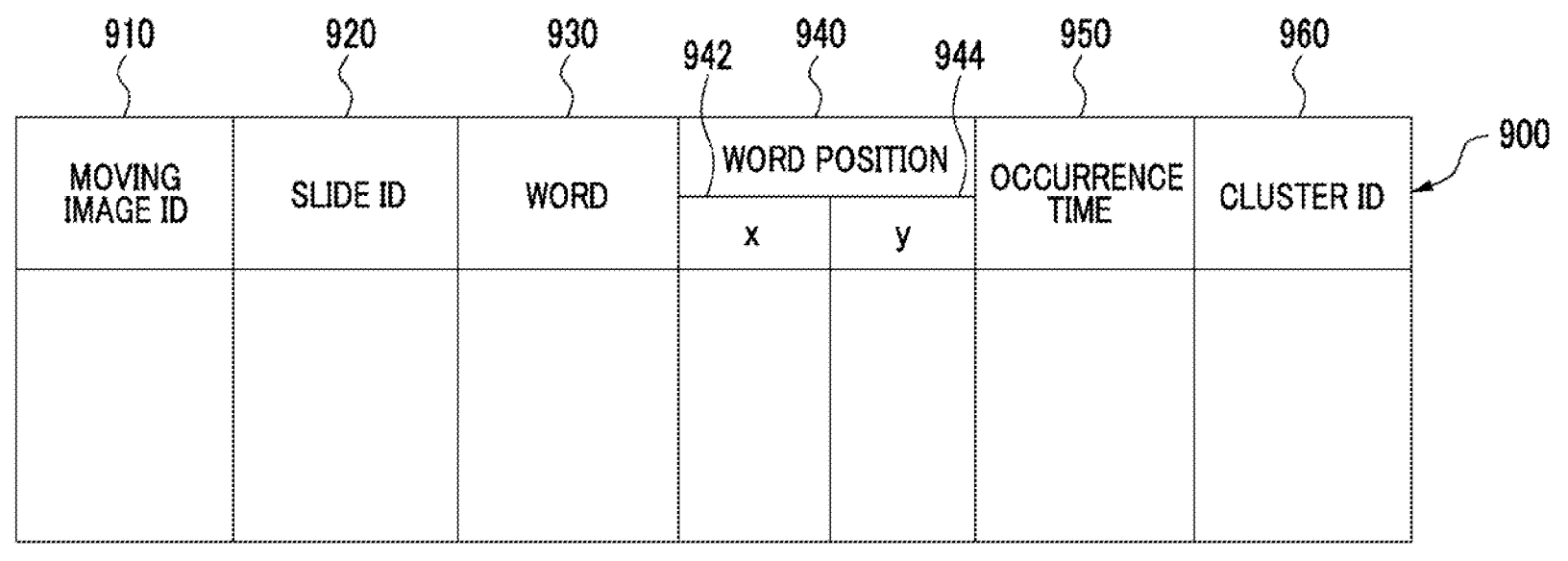

The coordinate storage module 120 stores, for example, a word and cluster table 900. FIG. 9 is a diagram illustrating an example of the data structure of the word and cluster table 900. The word and cluster table 900 includes a moving image ID field 910, a slide ID field 920, a word field 930, a word position field 940, an occurrence time field 950, and a cluster ID field 960. The word position field 940 includes an x field 942 and a y field 944. The moving image ID field 910 stores the moving image ID. The slide ID field 920 stores the slide ID. The word field 930 stores the words extracted by the coordinate recording module 118. The word position field 940 stores the positions of the words in the slide. The x field 942 stores the x coordinate. The y field 944 stores the y coordinate. The occurrence time field 950 stores the occurrence time of the word in the moving image. The cluster ID field 960 stores the processing result of the grouping module 130 (a cluster ID, which is information for uniquely identifying a cluster including the word in this exemplary embodiment).

The grouping module 130 is connected to the coordinate storage module 120 and the display module 140. The grouping module 130 generates a set (hereinafter, also referred to as a cluster) on the basis of the extraction result of the coordinate recording module 118 (the extraction result stored in the coordinate storage module 120). The grouping module 130 stores the cluster ID of the generated cluster in the cluster ID field 960 of the word and cluster table 900.

The cluster is generated on the basis of the position in a space formed by the following three elements: (1) the occurrence time of the word as a sound; (2) the position (x) of the word in the slide; and (3) the position (y) of the word in the slide. The existing clustering method may be used to generate the cluster. Each of the elements may have a range. The range of the occurrence time is a section from the time when the word is spoken and the time when the speech of the word ends and the range of the position is the range of the position of the word.

The grouping module 130 may generate the cluster on the basis of the occurrence time of the word extracted by the coordinate recording module 118 or the degree of association in the peripheral region of the position of the word, which will be described in detail below with reference to FIGS. 12 and 14.

The grouping module 130 may use a layout including the word in the slide as the position of the word extracted by the coordinate recording module 118, which will be described in detail below with FIG. 13.

The grouping module 130 may calculate the degree of association on the basis of the operation of the explainer in the moving image, which will be described in detail below with reference to FIG. 15.

The display module 140 is connected to the grouping module 130 and the designation module 150. The display module 140 displays the cluster generated by the grouping module 130 on the slide, which will be described in detail below with reference to FIGS. 11, 16A, and 17A.

The designation module 150 is connected to the display module 140 and the reproducing module 160. The designation module 150 designates the cluster displayed by the display module 140 on the basis of the operation of the operator.

The designation module 150 may display the words in the designated cluster on the slide in a different manner from that in which other words are displayed and designate the displayed words on the basis of the operation of the operator, which will be described in detail below with reference to FIGS. 16B and 17B.

The reproducing module 160 is connected to the designation module 150. The reproducing module 160 reproduces the moving image on the basis of the occurrence time of the words in the cluster designated by the designation module 150. The "reproduction of the moving image on the basis of the occurrence time of the words" may be the reproduction of the moving image in a predetermined order of the occurrence time of the words in the cluster. For example, the moving image may be reproduced from the earliest occurrence time of the word in the cluster (explanation is given earliest) or the latest occurrence time of the word in the cluster (explanation is given latest).

Figure 6:
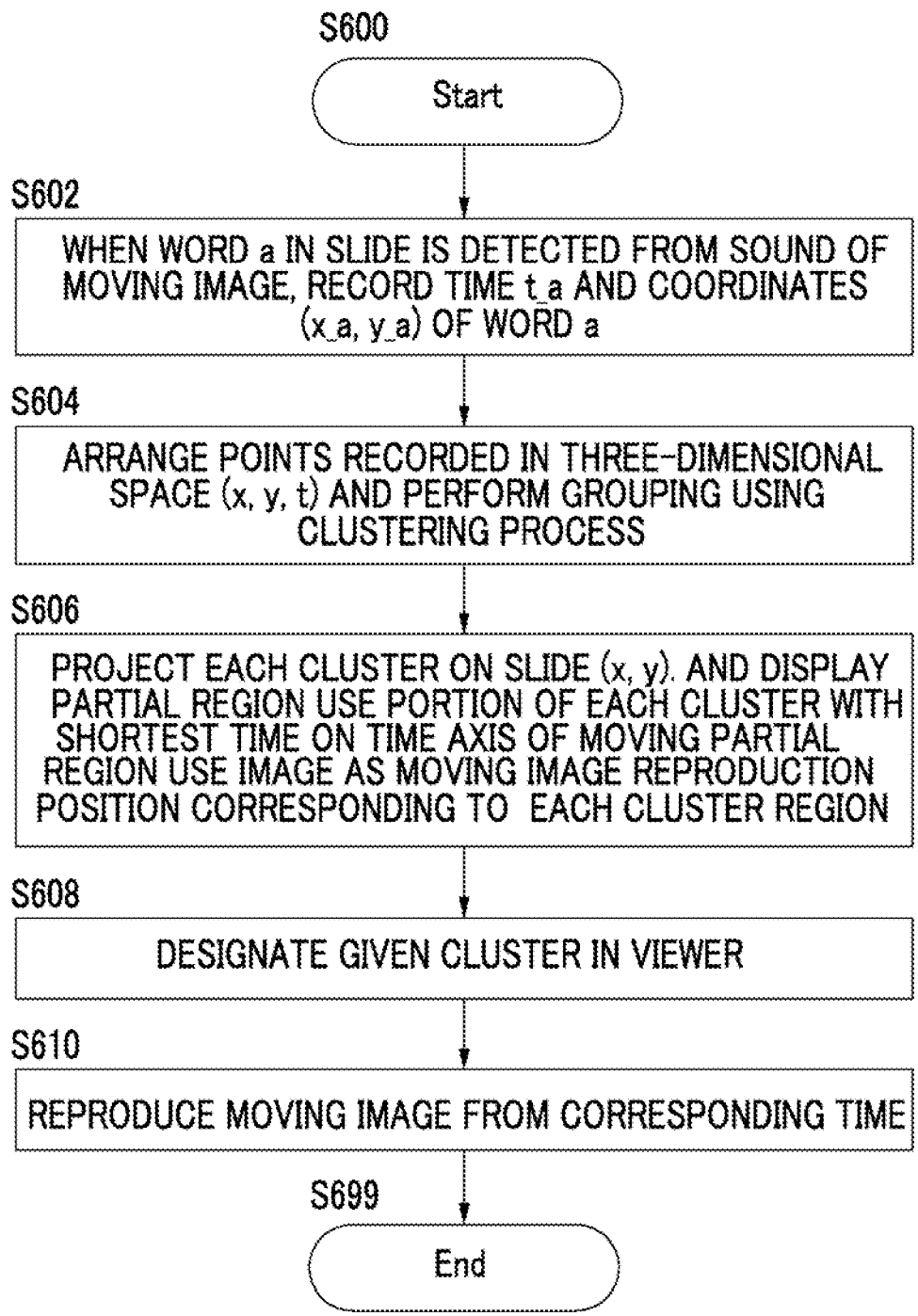
FIG. 6 is a flowchart illustrating an example of a process according to this exemplary embodiment.

FIG. 6 is a flowchart illustrating an example of a process according to this exemplary embodiment.

In Step S602, when a word a in the slide is detected from the sound of the moving image, the sound processing device 100 records the time t_a and the coordinates (x_a, y_a) of the word a.

Figure 7:
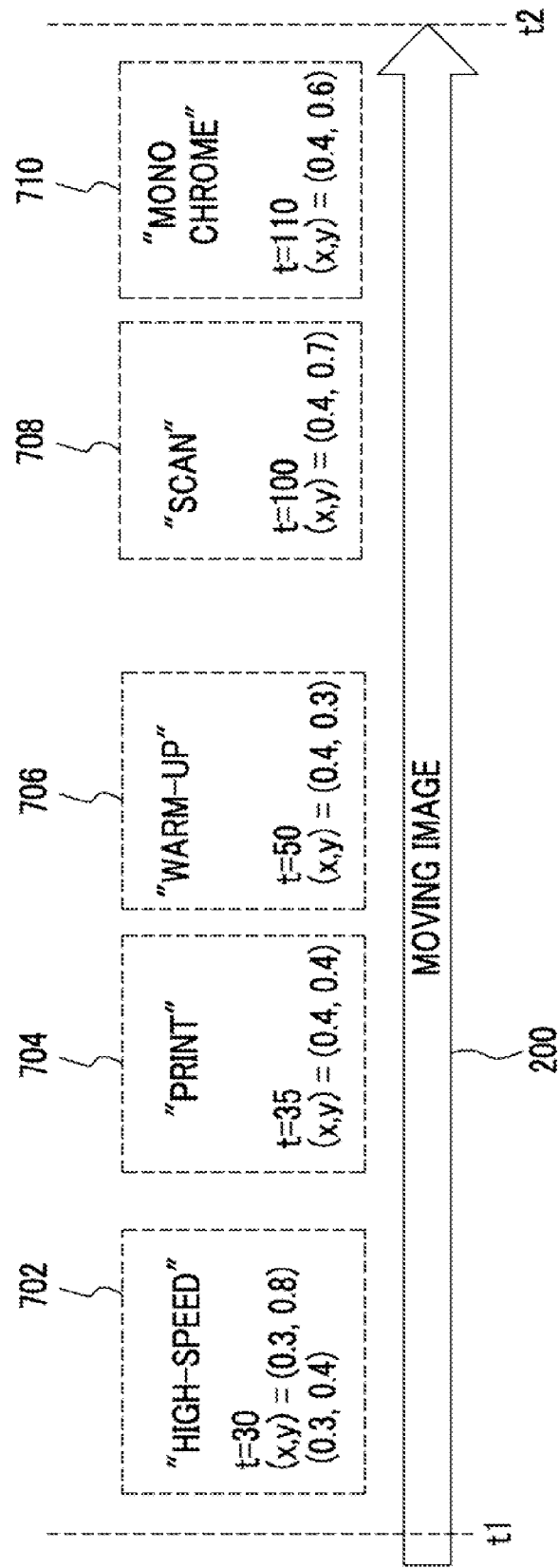
FIG. 7 is a diagram illustrating an example of the process of a sound processing device.
Figure 8:
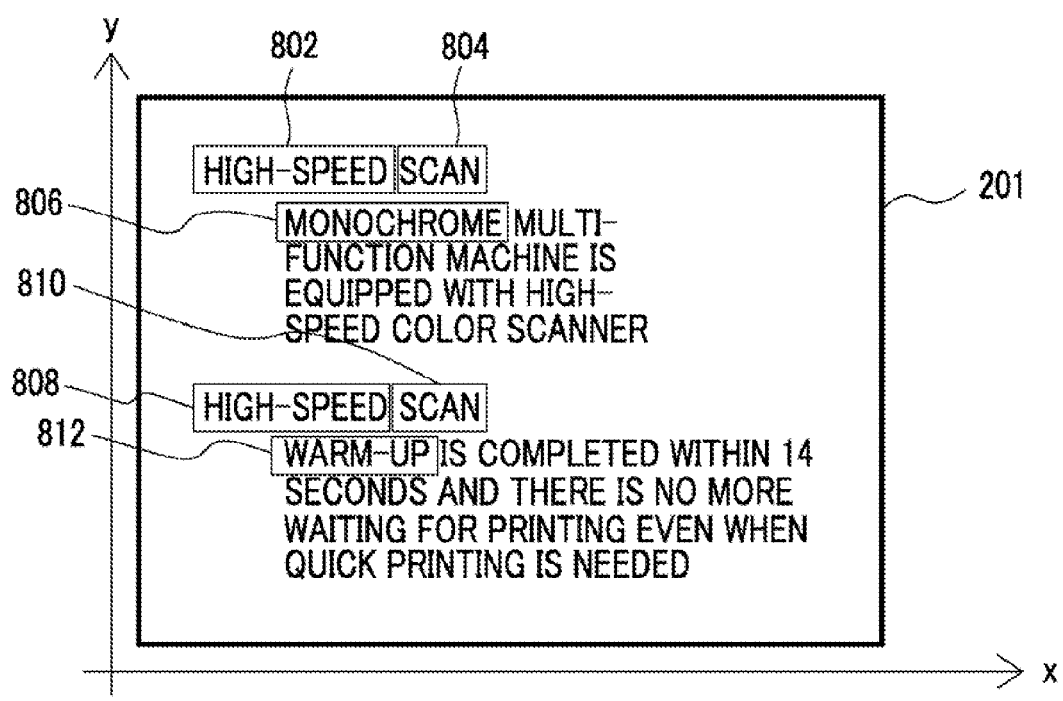
FIG. 8 is a diagram illustrating an example of the processing result of the sound processing device.

FIG. 7 is a diagram illustrating an example of the process of the sound processing device 100. FIG. 3 is a diagram illustrating an example of the processing result of the sound processing device 100.

A detection result 702 shows that words "high speed" are detected 30 seconds after a moving image 200 starts and the positions of a detection word 802 and a detection word 808 are detected from slide 1 (201).

A detection result 704 shows that a word "print" is detected 35 seconds after the moving image 200 starts and the position of a detection word 810 is detected from slide 1 (201).

A detection result 706 shows that a word "warm-up" is detected 50 seconds after the moving image 200 starts and the position of a detection word 812 is detected from slide 1 (201).

A detection result 708 shows that a word "scan" is detected 100 seconds after the moving image 200 starts and the position of a detection word 804 is detected from slide 1 (201).

A detection result 710 shows that a word "monochrome" is detected 110 seconds after the moving image 200 starts and the position of a detection word 806 is detected from slide 1 (201).

In Step S604, the grouping module 130 arranges the points recorded in a 3-dimensional space (x, y, t) and performs grouping using a clustering process.

Figure 10:
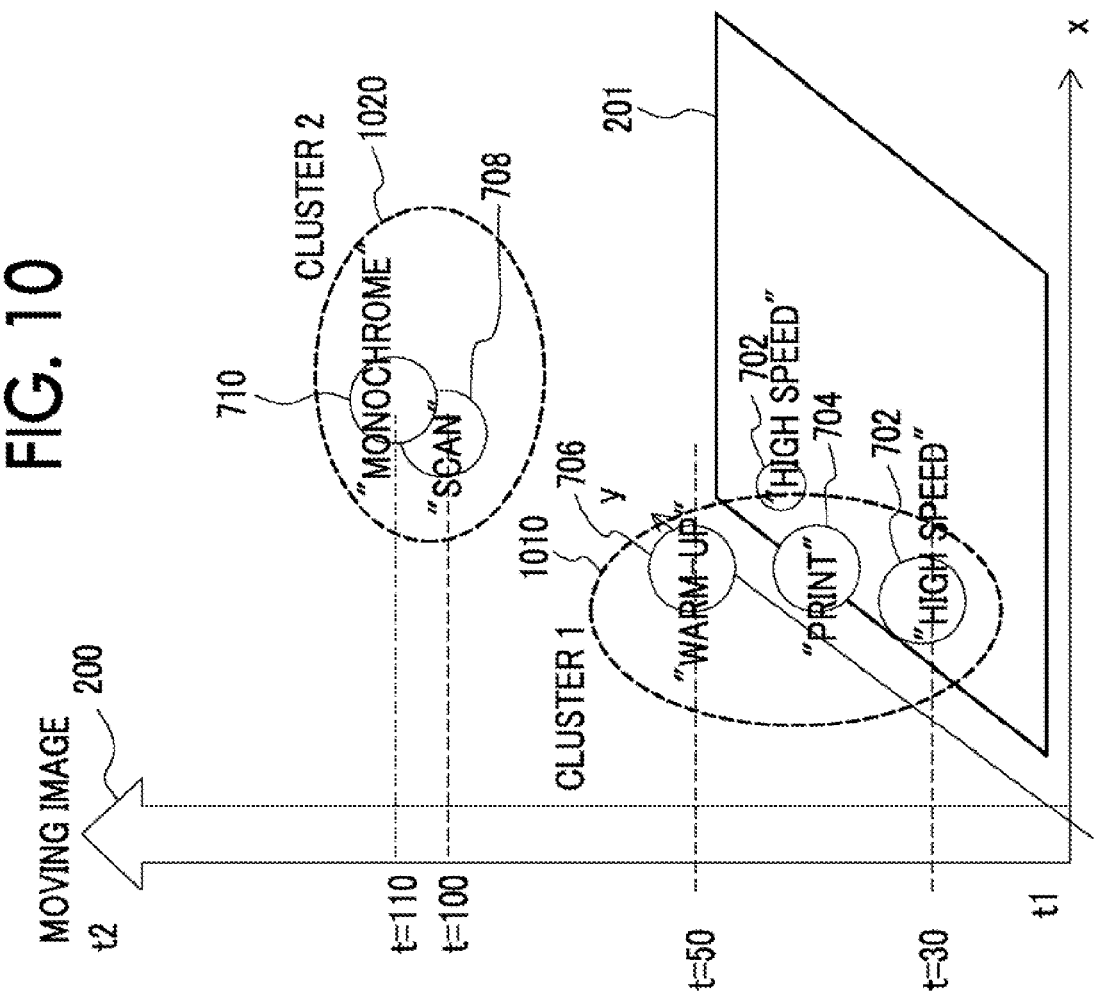
FIG. 10 is a diagram illustrating an example of the process of a grouping module.

FIG. 10 is a diagram illustrating an example of the process of the grouping module 130. The example of the space is formed by the x-axis and the y-axis (the x-axis and the y-axis of slide 1 (201)) shown in FIG. 3 and the elapsed time axis of the moving image 200. In the example shown in FIG. 10, as a result of the clustering process of the grouping module 130, two clusters, that is, cluster 1 (1010) including the detection result 702, the detection result 704, and the detection result 706 and cluster 2 (1020) including the detection result 708 and the detection result 710 are obtained.

Figure 11:
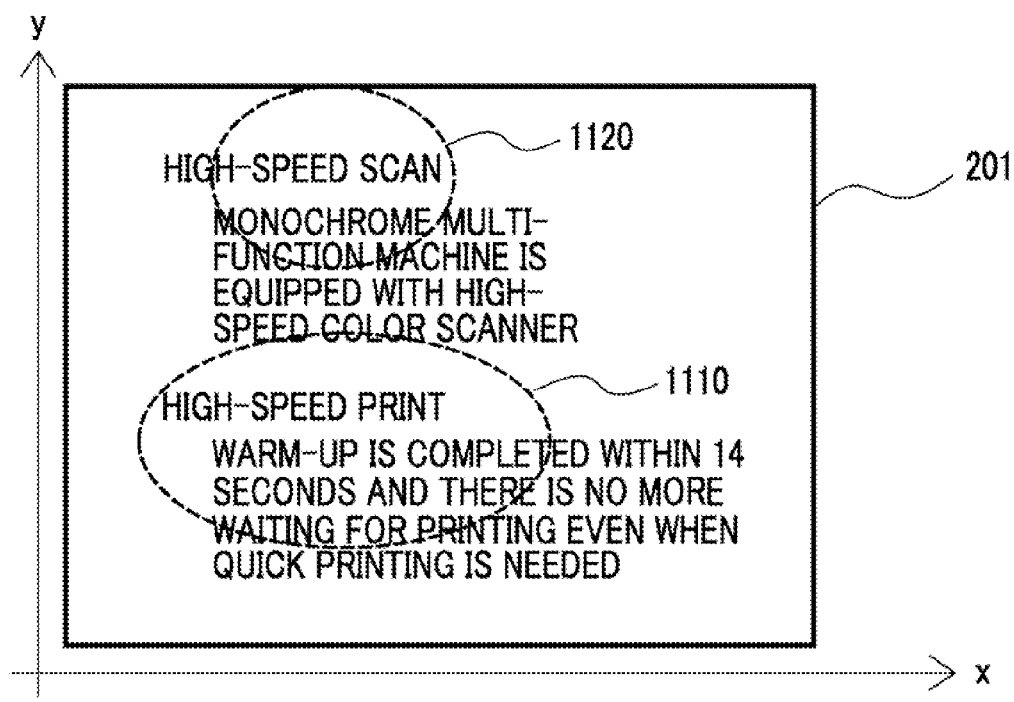
FIG. 11 is a diagram illustrating an example of the display of a display module.

In Step S606, the display module 140 projects each cluster on a slide (x, y) and displays a partial region. A portion of each cluster with the shortest time (the oldest portion) on the time axis of the moving image is used as a moving image reproduction position corresponding to each cluster region. FIG. 11 is a diagram illustrating an example of the display of the display module 140. The display module 140 displays slide 1 (201) on, for example, a display provided in this exemplary embodiment and displays the clustering result of the grouping module 130 (a projection region 1110 of cluster 1 and a projection region 1120 of cluster 2) on slide 1.

In Step S608, the designation module 150 designates a given cluster in a viewer. That is, the operator performs an operation to designate the cluster on the slide displayed in Step S606.

In Step S610, the reproducing module 130 reproduces the moving image from the corresponding time. That is, the reproducing module 160 reproduces the moving image from the moving image reproduction position of the cluster designated in Step S608.

In addition, the grouping module 130 may perform the following processes (FIGS. 12, 13, 14, and 15).

Figure 12A:
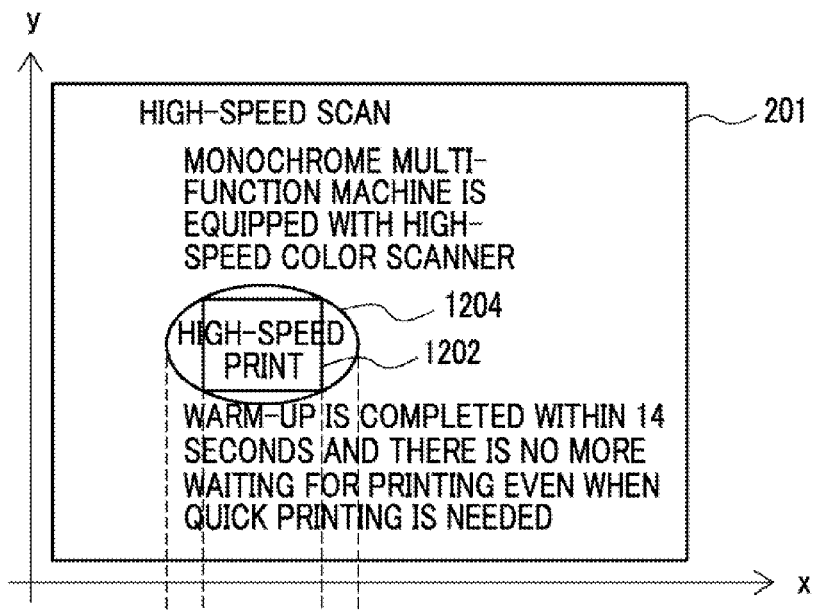
FIGS. 12A and 12B are diagrams illustrating an example of the process of the grouping module.
Figure 12B:
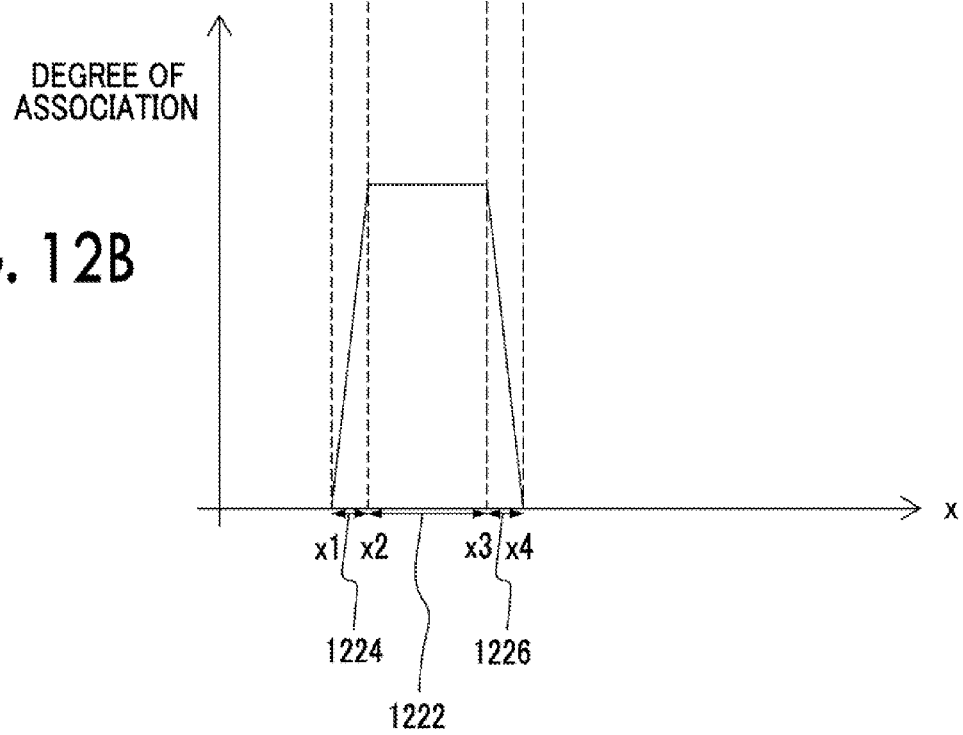

FIG. 12 is a diagram illustrating an example of the process of the grouping module 130. In the above-mentioned example, the clustering process is performed on the basis of the position (x, y) of the word in the slide. However, the degree of association may be given to the peripheral region of the position (x, y) of the word in the slide and the clustering process may be performed. For example, as shown in FIG. 12, an expression may be used such that, as the degree of association, the maximum degree of association is given to a detection word region 1202 (a detection word region 1222 in the x-axis), the minimum degree of association is given to the peripheral region (association regions 1224 and 1226) of the detection word region at x1 in FIG. 12, the maximum degree of association is given at x2 and x3, and the minimum degree of association is given at x4. In addition, the positions x1 and x4 (that is, values indicating the size of the peripheral region) may be predetermined values or values corresponding to the size of the detection word region 1202. In some cases, the peripheral regions of different words overlap each other. In this case, the degrees of association thereof may be added or the larger (or the smaller) of the degrees of association may be used.

Figure 13A:
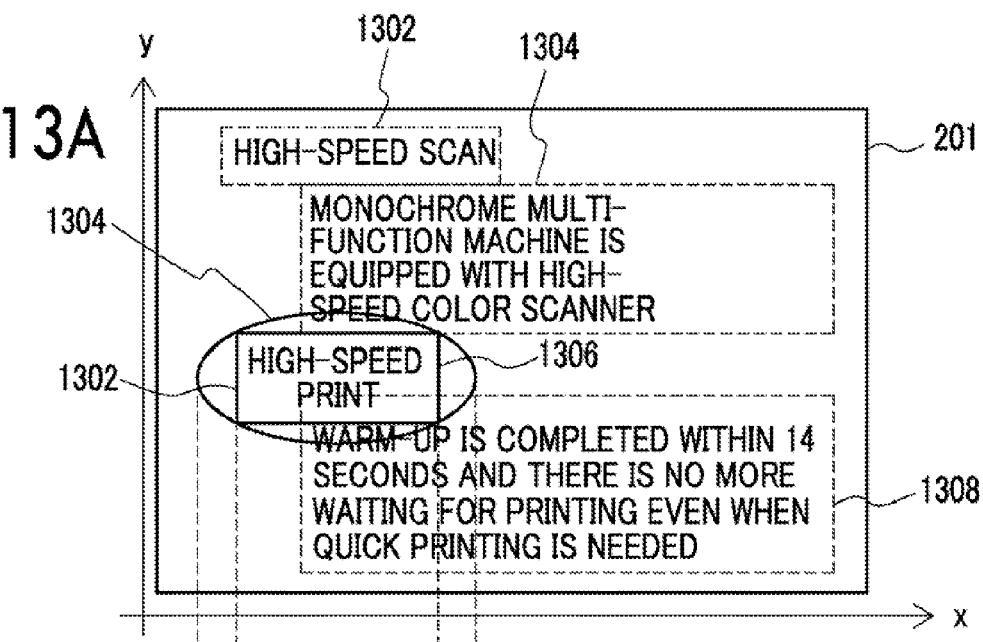
FIGS. 13A and 13B are diagrams illustrating an example of the process of the grouping module.
Figure 13B:
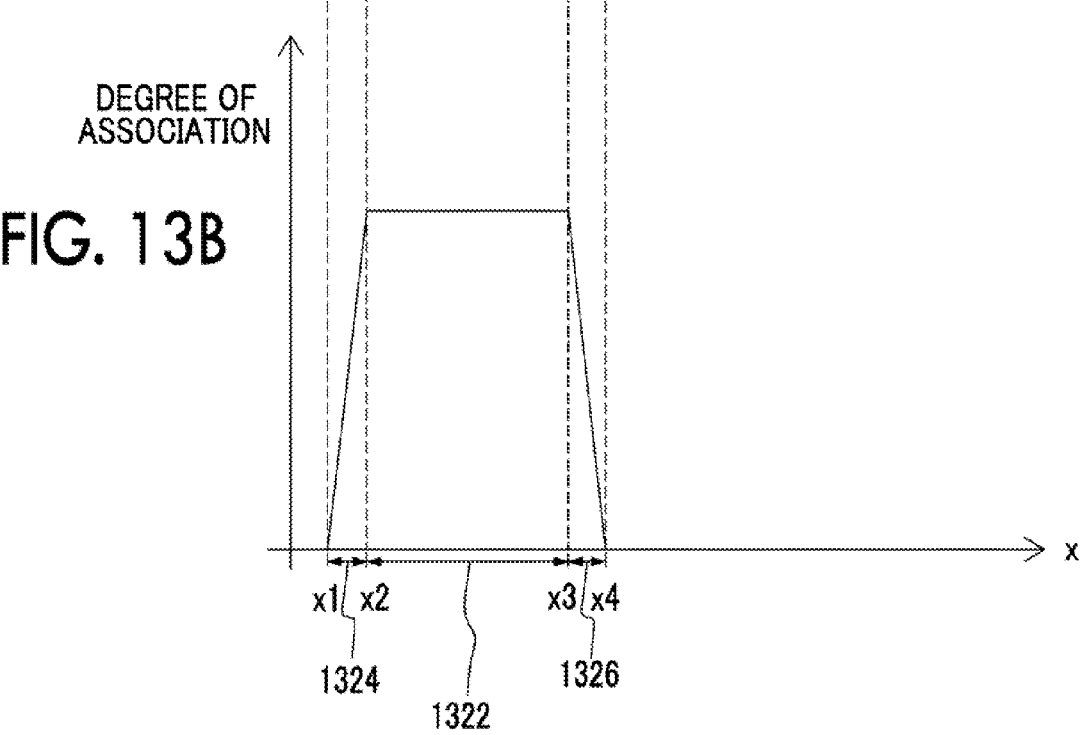

FIG. 13 is a diagram illustrating an example of the process of the grouping module 130. Slide 1 (201) may be divided into layout regions in advance and a layout region including the word may be used. That is, the clustering process is performed using the "position of the layout region including the word" as "the position of the word". In this case, the degree of association may be given. The division into the layout regions means that, for example, when slide 1 (201) is an image, it is divided into the layout regions in a blank region with a size equal to or greater than a predetermined value. When slide 1 (201) is an electronic document, tag information (information indicating, for example, a title or a paragraph) in the electronic document is used to divide the electronic document into the layout regions. In the example shown in FIG. 13, a title region 1306 is extracted as the layout region including the word "print" and the clustering process is performed using the position of the title region 1306 as the position of the word "print". In addition, the same degree of association as that shown in FIG. 12 is given to the title region 1306.

Figure 14:
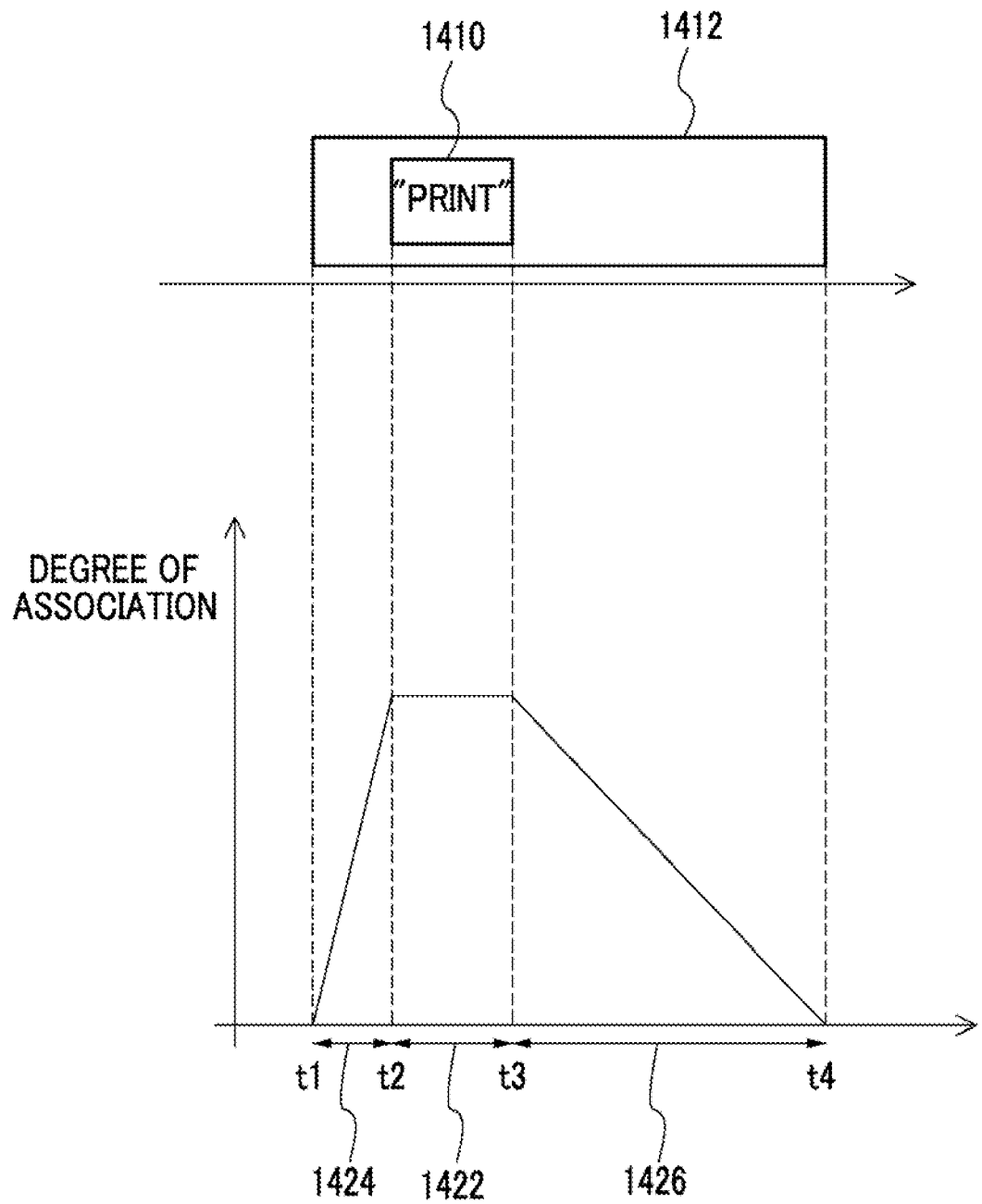
FIG. 14 is a diagram illustrating an example of the process of the grouping module.

FIG. 14 is a diagram illustrating an example of the process of the grouping module 130. An association region (sound) 1412 is the peripheral region of the sound recognition result (detection word region (sound) 1410) of the word "print" by the sound recognition module 112. The association region (sound) 1412 may be a series of speech sections (section from a silent point to a silent point) or a section to which an association region (sound) 1424 and an association region (sound) 1426 predetermined for the detection word region (sound) 1410 are added. The length of the peripheral region (association region (sound) 1426) of the association region (sound) 1412 after the occurrence time of the word may be more than that of the peripheral region (association region (sound) 1424) thereof before the occurrence time of the word. In many cases, the sound after a target word is generated is more likely to explain the word than the sound before the target word is generated and the degree of association is high.

Figure 15:
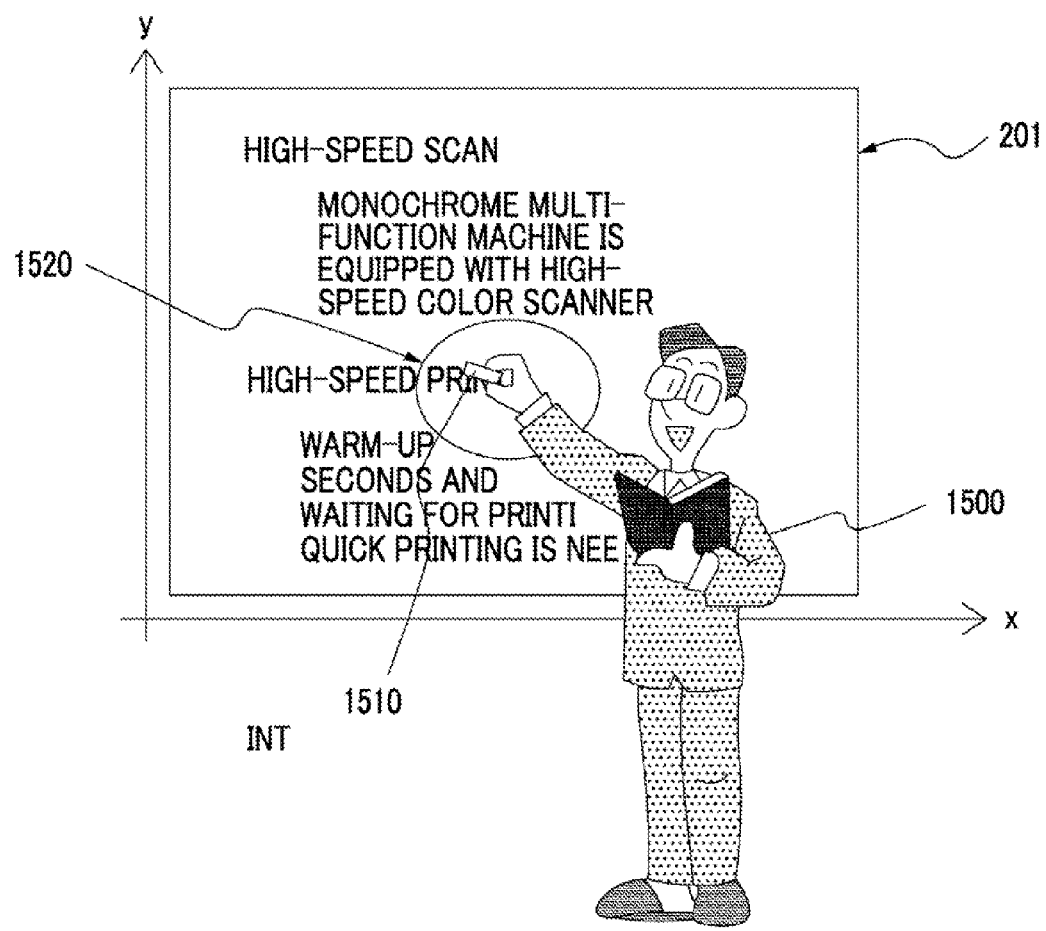
FIG. 15 is a diagram illustrating an example of the process of the grouping module.

FIG. 15 is a diagram illustrating an example of the process of the grouping module 130.

In some cases, the explainer 1500 indicates slide 1 (201) with, for example, a pointing device 1510 for explanation. The degree of association between a slide region (x, y) and time is calculated from pointing information (a position on slide 1 (201) indicated by the pointing device 1510) to slide 1 (201). When the explainer 1500 indicates a pointing region 1520 with the pointing device 1510, the degree of association of the word in the sound which is generated at the time when the operation is performed is higher than the degree of association of the word at another time (the time when the operation is not performed). In addition, the degree of association of the word at the position of the pointing region 1520 generated by the operation is higher than the degree of association of the word at a different position (word at the position other than the pointing region 1520).

As the pointing device 1510, for example, a 3-dimensional mouse which detects a 3-dimensional position may be used.

In addition to the pointing device 1510, a device may be used which detects the position of the hands of the explainer 1500 in the moving image using a moving image recognition technique. When slide 1 (201) is an electronic document and a cursor is displayed and is moved by, for example, a mouse, the position of the cursor may be detected. When the display which displays slide 1 (201) is a touch panel, a touch position may be detected.

FIGS. 16A and 16B are diagrams illustrating an example of the display of the display module 140 and the designation module 150. FIG. 16A shows the same example as that shown in FIG. 11. FIG. 16B shows a state in which a projection region 1110 of cluster 1 is selected from the state shown in FIG. 16A by the operation of the operator. That is, in the above-mentioned example, when a cluster is designated, the moving image is reproduced from the time corresponding to the cluster. However, in this example, a keyword included in the cluster is displayed in a different manner from that in which other words are displayed and, when the word is designated, the moving image is reproduced from the time when the word is spoken. As a different manner, for example, the word may be surrounded as in a keyword region 1612 shown in FIG. 16B, the word may be displayed in red, the word may be displayed with a large size, or the word may be flickered. As a different manner, the word may be displayed as shown in FIG. 17B. In addition, the projection region 1110 of the selected cluster 1 may be enlarged and displayed. When the projection region 1110 of cluster 1 is designated, it may be determined that there are plural words in the cluster. When there are plural words in the cluster, this process may be performed.

For example, when a keyword region 1612 is designated, word "high-speed" is selected as the keyword and the moving image is reproduced from t=30. When a keyword region 1614 is designated, a word "print" is selected as the keyword and the moving image is reproduced from t=35. When a keyword region 1616 is designated, a word "warm-up" is selected as the keyword and the moving image is reproduced from t=50.

FIGS. 17A and 17B are diagrams illustrating an example of the display of the display module 140 and the designation module 150. FIG. 17A shows the same example as that shown in FIG. 11. FIG. 17B shows a state when the projection region 1110 of cluster 1 is selected from the state shown in FIG. 17A by the operation of the operator.

When a cluster is designated, it is determined whether there are plural candidates of the reproduction time in the cluster. When there are plural candidates of the reproduction time in the cluster, a dialogue of a thumbnail list of the moving image is displayed. That is, when the projection region 1110 of cluster 1 is designated, it is determined whether there are plural words in the cluster. When there are plural words in the cluster, a keyword display region 1710 is displayed. A list of the words which are included in the projection region 1110 of cluster 1 and are detected by the word detecting module 114 is displayed in the keyword display region 1710. When a word in the keyword, display region 1710 is designated, the moving image is displayed from the time corresponding to the word.

In the exemplary embodiment shown in FIG. 1, the process is performed by the grouping module 130. However, the process may not be performed. That is, as an exemplary embodiment, the grouping module 130 may not be provided. In this case, the coordinate storage module 120 is connected to the display module 140.

The display module 140 displays the word extracted by the coordinate recording module 118 (the extraction result stored in the coordinate storage module 120) in a different manner from that in which other words are displayed. For example, the word is displayed as shown in FIGS. 16B and 17B. However, of course, the cluster is not displayed.

The designation module 150 designates the word displayed by the display module 140 on the basis of the operation of the operator.

The reproducing module 160 reproduces the moving image from the occurrence time of the word designated by the designation module 150.

Figure 18:
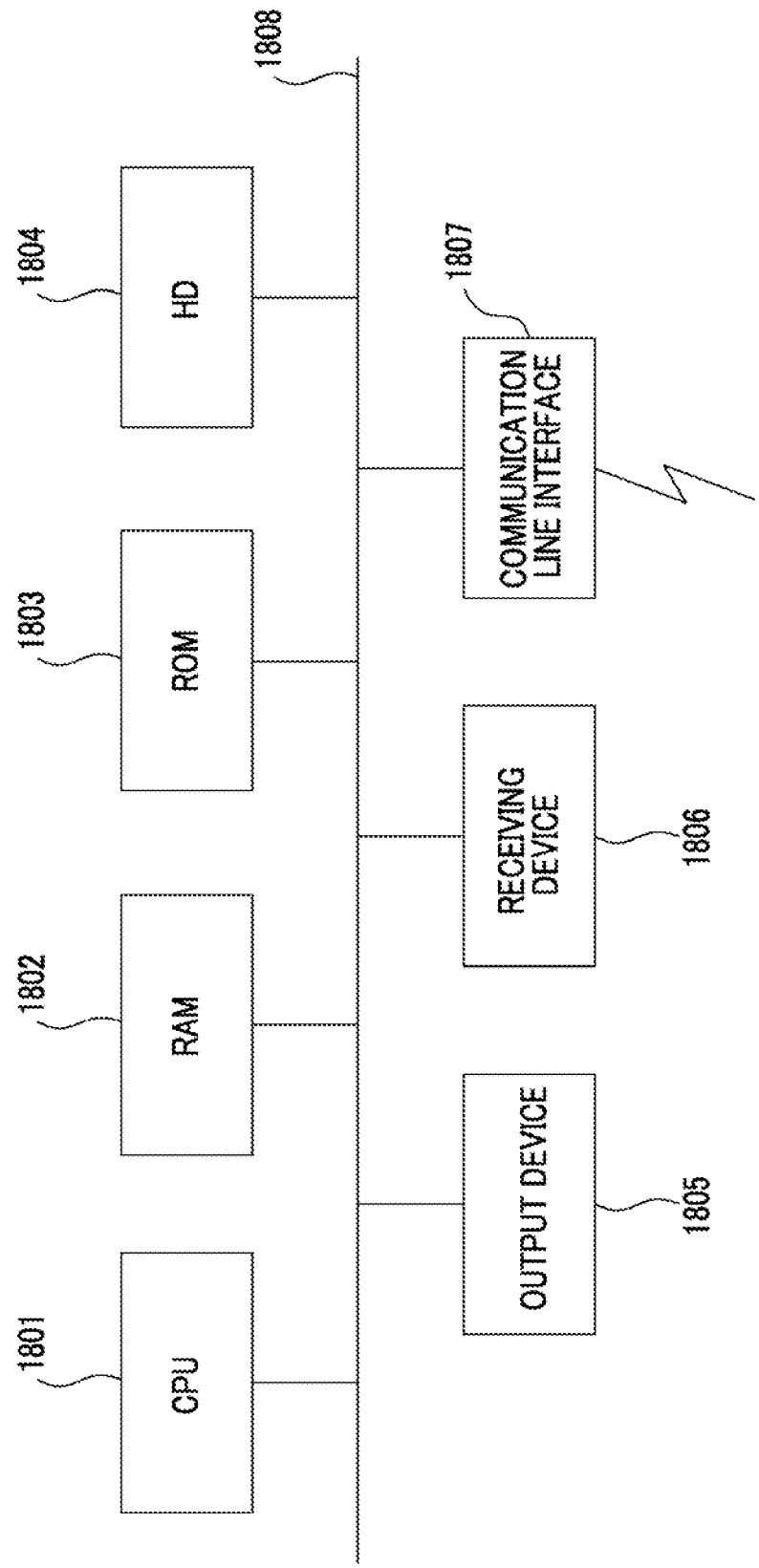
FIG. 18 is a block diagram illustrating an example of the hardware structure of a computer which implements this exemplary embodiment.

FIG. 18 shows the hardware structure of a computer that executes a program according to this exemplary embodiment. The computer is a general computer and is specifically a personal computer or a server. That is, for example, a CPU 1801 is used as a processing unit (arithmetic unit) and a RAM 1802, a ROM 1803, and an HD 1804 are used as storage devices. For example, a hard disk may be used as the HD 1804. The computer includes the CPU 1801 that executes a program to implement the functions of, for example, the sound recognition module 112, the word detecting module 114, the coordinate recording module 118, the grouping module 130, the display module 140, the designation module 150, and the reproducing module 160, the RAM 1802 that stores the program or data, the ROM 1803 that stores, for example, a program for starting the computer, the HD 1804, which is an auxiliary storage device, a receiving device 1806 that receives data on the basis of the operation of the user for a keyboard, a mouse, or a touch panel, an output device 1805, such as a CRT or a liquid crystal display, a communication line interface 1807, such as a network interface card for connection to a communication network, and a bus 1808 that connects the devices for data communication. Plural computers may be connected to each other by a network.

For a computer program in the above-described exemplary embodiment, the system with this hardware structure reads the computer program, which is software, and the above-described exemplary embodiment is implemented by cooperation between software and hardware resources.

The hardware structure shown in FIG. 18 is an illustrative example, but this exemplary embodiment is not limited to the hardware structure shown in FIG. 18. This exemplary embodiment may have any configuration as long as it may execute the modules described in this exemplary embodiment. For example, some modules may be configured as dedicated hardware components (for example, ASIC) and some modules may be provided in an external system and connected by a communication line. In addition, plural systems shown in FIG. 18 may be connected to each other by a communication line so as to cooperate with each other. In particular, the hardware structure may be incorporated into, for example, an information appliance, a copier, a facsimile, a scanner, a printer, and a multi-function machine (an image processing apparatus having two or more of functions of, for example, a scanner, a printer, a copier, and a facsimile), in addition to the personal computer.

The above-mentioned program may be stored in a recording medium and then provided. In addition, the above-mentioned program may be provided by a communication unit. In this case, for example, the above-mentioned program may be understood as the invention of a "computer-readable recording medium having a program recorded thereon".

The "computer-readable recording medium having a program recorded thereon" refers to a computer-readable recording medium having a program recorded thereon which is used to, for example, install, execute, and distribute the program.

Examples of the recording medium may include digital versatile discs (DVDs), such as "DVD-R, DVD-RW, and DVD-RAM" which are the standards defined by the DVD Forum, and "DVD+R and DVD+RW" which are the standards defined by DVD+RW, compact discs (CDs), such as a read-only memory (CD-ROM), CD recordable (CD-R), and CD rewritable (CD-RW), a blue-ray disc (registered trademark), a magneto-optical disc (MO), a flexible disk (FD), a magnetic tape, a hard disk, a read only memory (ROM), an electrically erasable programmable read-only memory (EE-PROM (registered trademark)), a flash memory, a random access memory (RAM), and an SD (Secure Digital) memory card.

The program or a part thereof may be recorded and stored in the recording medium and then distributed. In addition, the program or a part thereof may be transmitted by communication using transmission media, such as wired networks including a local area network (LAN), a metropolitan area network (MAN), a wide area network (WAN), the Internet, an intranet, and an extranet, wireless communication networks, and combinations thereof. In addition, the program or a part thereof may be transmitted using carrier waves.

The program may be a part of another program, or it may be recorded on the recording medium along with a separate program. In addition, the program may be divided and recorded on plural recording media. In addition, the program may be recorded in any form including, for example, compression and encryption as long as it may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a sound recognition unit that recognizes a sound of a moving image including a document;
   a detecting unit that detects a word which appears in both a recognition result of the sound recognition unit and a word extracted from the document in the moving image;
   an extracting unit that extracts an occurrence time of the word detected by the detecting unit in the moving image and a position of the word in the document;
   a display unit that performs a process such that the word extracted by the extracting unit is displayed in a different manner from another word in the document, the display displaying the word extracted by the extracting unit on the document in the different manner;
   a designating unit that designates the word displayed by the display unit based on an operation performed by an operator to designate the word that is displayed by the display unit; and
   a reproducing unit that reproduces the moving image from the occurrence time of the word designated by the designating unit.

2. The information processing apparatus according to claim 1, further comprising:
   a generating unit that generates a cluster based on an extraction result of the extracting unit,
   wherein the display unit displays the cluster generated by the generating unit on the document,
   the designating unit designates the cluster displayed by the display unit based on the operation of the operator, and the reproducing unit reproduces the moving image based on the occurrence time of the word among words in the cluster designated by the designating unit.

3. The information processing apparatus according to claim 2,
   wherein the generating unit generates the cluster based on the occurrence time of the word extracted by the extracting unit or a degree of association in a peripheral region of the position of the word.

4. The information processing apparatus according to claim 3,
   wherein the generating unit uses a layout including the word in the document as the position of the word extracted by the extracting unit.

5. The information processing apparatus according to claim 4,
   wherein the generating unit calculates the degree of association based on an operation of an explainer in the moving image.

6. The information processing apparatus according to claim 5,
   wherein the designating unit displays the word in the designated cluster on the document in a different manner from that in which another word is displayed and designates the displayed word based on the operation of the operator.

7. The information processing apparatus according to claim 4,
   wherein the designating unit displays the word in the designated cluster on the document in a different manner from that in which another word is displayed and designates the displayed word based on the operation of the operator.

8. The information processing apparatus according to claim 3,
   wherein the generating unit calculates the degree of association based on an operation of an explainer in the moving image.

9. The information processing apparatus according to claim 8,
   wherein the designating unit displays the word in the designated cluster on the document in a different manner from that in which another word is displayed and designates the displayed word based on the operation of the operator.

10. The information processing apparatus according to claim 3,
    wherein the designating unit displays the word in the designated cluster on the document in a different manner from that in which another word is displayed and designates the displayed word based on the operation of the operator.

11. The information processing apparatus according to claim 2,
    wherein the designating unit displays the word in the designated cluster on the document in a different manner from that in which another word is displayed and designates the displayed word based on the operation of the operator.

12. The information processing apparatus according to claim 1,
    wherein the document is captured in the moving image.

13. The information processing apparatus according to claim 1, further comprising:
    a generating unit that generates a cluster including the word, the cluster being generated based on the occurrence time and the position extracted by the extracting unit.

14. A non-transitory computer readable medium storing an information processing program that causes a computer to function as:
- a sound recognition unit that recognizes a sound of a moving image including a document;
- a detecting unit that detects a word which appears in both a recognition result of the sound recognition unit and a word extracted from the document in the moving image;
- an extracting unit that extracts an occurrence time of the word detected by the detecting unit in the moving image and a position of the word in the document;
- a display unit that performs a process such that the word extracted by the extracting unit is displayed in a different manner from another word in the document, the display displaying the word extracted by the extracting unit on the document in the different manner;
- a designating unit that designates the word displayed by the display unit based on an operation of an operator to designate the word that is displayed by the display unit; and
- a reproducing unit that reproduces the moving image from the occurrence time of the word designated by the designating unit.

15. The non-transitory computer readable medium according to claim 14,
wherein the document is captured in the moving image.

16. An information processing method comprising:
- recognizing a sound of a moving image including a document;
- detecting a word which appears in both a sound recognition result and a word extracted from the document in the moving image;
- extracting an occurrence time of the detected word in the moving image and a position of the detected word in the document;
- performing a process such that the word extracted is displayed in a different manner from another word in the document;
- displaying the extracted word on the document in the different manner;
- designating the displayed word based on an operation of an operator to designate the word that is displayed; and
- reproducing the moving image from the occurrence time of the designated word.

17. The information processing method according to claim 16,
wherein the document is captured in the moving image.

* * * * *